(12) United States Patent
Moffat et al.

(10) Patent No.: US 9,215,066 B2
(45) Date of Patent: Dec. 15, 2015

(54) METHOD AND SYSTEM FOR MAKING INFORMATION IN A DATA SET OF A COPY-ON-WRITE FILE SYSTEM INACCESSIBLE

(75) Inventors: Darren James Moffat, Berkshire (GB); James Prescott Hughes, Palo Alto, CA (US)

(73) Assignee: Oracle America, Inc., Redwood City, CA (US)

( * ) Notice: Subject to any disclaimer, the term of this patent is extended or adjusted under 35 U.S.C. 154(b) by 1231 days.

(21) Appl. No.: 12/145,684

(22) Filed: Jun. 25, 2008

(65) Prior Publication Data

US 2009/0323940 A1   Dec. 31, 2009

(51) Int. Cl.
*H04L 9/08* (2006.01)
*H04L 9/14* (2006.01)

(52) U.S. Cl.
CPC ............... *H04L 9/0894* (2013.01); *H04L 9/14* (2013.01)

(58) Field of Classification Search
CPC .................................................... H04L 9/0894
USPC ............................................................ 380/44
See application file for complete search history.

(56) References Cited

U.S. PATENT DOCUMENTS

| | | | |
|---|---|---|---|
| 5,819,292 A | 10/1998 | Hitz et al. | |
| 6,892,211 B2 * | 5/2005 | Hitz et al. | 714/5.1 |
| 7,152,165 B1 | 12/2006 | Maheshwari et al. | |
| 7,865,741 B1 * | 1/2011 | Wood et al. | 713/193 |
| 2002/0083183 A1 * | 6/2002 | Pujare et al. | 709/231 |
| 2003/0004882 A1 * | 1/2003 | Holler et al. | 705/51 |
| 2003/0079100 A1 * | 4/2003 | Williams et al. | 711/165 |
| 2005/0273858 A1 * | 12/2005 | Zadok et al. | 726/24 |
| 2007/0005894 A1 | 1/2007 | Dodge | |
| 2007/0079098 A1 * | 4/2007 | Kitamura | 711/170 |
| 2007/0113157 A1 * | 5/2007 | Perego | 714/770 |
| 2007/0180239 A1 * | 8/2007 | Fujibayashi et al. | 713/165 |
| 2008/0184218 A1 * | 7/2008 | Largman et al. | 717/168 |
| 2008/0294906 A1 * | 11/2008 | Chang et al. | 713/182 |
| 2010/0217970 A1 * | 8/2010 | Carter et al. | 713/150 |

OTHER PUBLICATIONS

Darren J Moffat, ZFS Encryption Project, Feb. 7, 2007,p. 1-8.*
Peterson et al., "Secure Deletion for a Versoning File System", 2005.*
Wikipedia, "copy-on-write", 2015.*
Wlkipedia, "versioning file system", 2015.*
http://en.wikipedia.org/wiki/Write_Anywhere_File_Layout; pp. 1-2, May 22, 2008.

* cited by examiner

*Primary Examiner* — O. C. Vostal
(74) *Attorney, Agent, or Firm* — Brooks Kushman P.C.

(57) ABSTRACT

Information in a data set of a copy-on-write file system may be made inaccessible. A first key for encrypting a data set of a copy-on-write file system is generated and wrapped with a second key. An encrypted data set is created with the first key. The wrapped first key is stored with the encrypted data set. A command to delete the encrypted data set is received and the second key is altered or changed to make information in the encrypted data set of the copy-on-write file system inaccessible.

16 Claims, 2 Drawing Sheets

METHOD AND SYSTEM FOR MAKING INFORMATION IN A DATA SET OF A COPY-ON-WRITE FILE SYSTEM INACCESSIBLE

BACKGROUND

1. Field

The invention relates to methods and systems for making information in a data set of a copy-on-write file system inaccessible.

2. Discussion

Copy-on-write ("COW") is an optimization strategy used in computer programming. Multiple requesters of resources that are initially indistinguishable are given pointers to the same resource. This strategy is maintained until a requestor attempts to modify its copy of the resource. A private copy is then created to prevent any changes from becoming visible to the other requesters. The creation of such private copies is transparent to the requesters. No private copy is created if a requester does not attempt to modify its copy of the resource.

Virtual memory operating systems may use COW. If a process creates a copy of itself, pages in memory that may be modified by the process (or its copy) are marked COW. If one process modifies the memory, the operating system's kernel may intercept the operation and copy the memory so that changes in one process's memory are not visible to the other.

COW may also be used in the calloc function provided in the C and C++ standard libraries for performing dynamic memory allocation. A page of physical memory, for example, may be filled with zeroes. If the memory is allocated, the pages returned may all refer to the page of zeroes and may be marked as COW. As such, the amount of physical memory allocated for a process does not increase until data is written.

A memory management unit (MMU) may be instructed to treat certain pages in an address space of a process as read-only in order to implement COW. If data is written to these pages, the MMU may raise an exception to be handled by a kernel. The kernel may then allocate new space in physical memory and make the page being written correspond to that new location in physical memory.

COW may permit efficient use of memory. Physical memory usage only increases as data is stored in it. Hash tables may be implemented that use little more physical memory than is necessary to store the objects they contain. Such programs, however, may run out of virtual address space because virtual pages unused by the hash table cannot be used by other parts of the program.

Outside a kernel, COW may be used in library, application and system code. For example, the string class provided by the C++ standard library allows COW implementations. COW may also be used in virtualization/emulation software such as Bochs, QEMU and UML for virtual disk storage. This may (i) reduce required disk space as multiple virtual machines (VMs) may be based on the same hard disk image and (ii) increase performance as disk reads may be cached in RAM and subsequent reads served to other VMs outside of the cache.

COW may be used in the maintenance of instant snapshots on database servers. Instant snapshots preserve a static view of a database by storing a pre-modification copy of data when underlying data are updated. Instant snapshots are used for testing or moment-dependent reports and are not generally used to replace backups. COW may also be used as the underlying mechanism for snapshots provided by logical volume management.

COW may be used to emulate a read-write storage on media that require wear leveling or are physically Write Once Read Many.

SUMMARY

A method for making information in a data set of a copy-on-write file system inaccessible includes generating a first key for encrypting a data set of a copy-on-write file system, wrapping the first key with a second key and creating an encrypted data set with the first key. The method also includes storing the wrapped first key with the encrypted data set, receiving a command to delete the encrypted data set and altering or changing the second key to make information in the encrypted data set of the copy-on-write file system inaccessible.

A method for making information in a data set of a copy-on-write file system inaccessible includes generating a plurality of keys each for encrypting one of a plurality of data sets of a copy-on-write file system, wrapping each of the plurality of keys with a first administrative key and creating a plurality of data sets each being encrypted with one of the plurality of keys. The method also includes storing each of the wrapped plurality of keys with one of the encrypted data sets, unwrapping at least one of the wrapped plurality of keys and wrapping the at least one of the plurality of keys with a second administrative key to make information in the data sets encrypted with other of the plurality of keys wrapped with the first administrative key inaccessible.

A system for making information in a data set of a copy-on-write file system inaccessible includes a computer configured to generate a first key for encrypting a data set of a copy-on-write file system, create an encrypted data set with the first key and encrypt the first key with a second key. The computer is also configured to store the encrypted first key with the encrypted data set, receive a command to delete the encrypted data set and alter or change the second key to make information in the encrypted data set inaccessible.

While example embodiments in accordance with the invention are illustrated and disclosed, such disclosure should not be construed to limit the invention. It is anticipated that various modifications and alternative designs may be made without departing from the scope of the invention.

DETAILED DESCRIPTION

Figure 1:
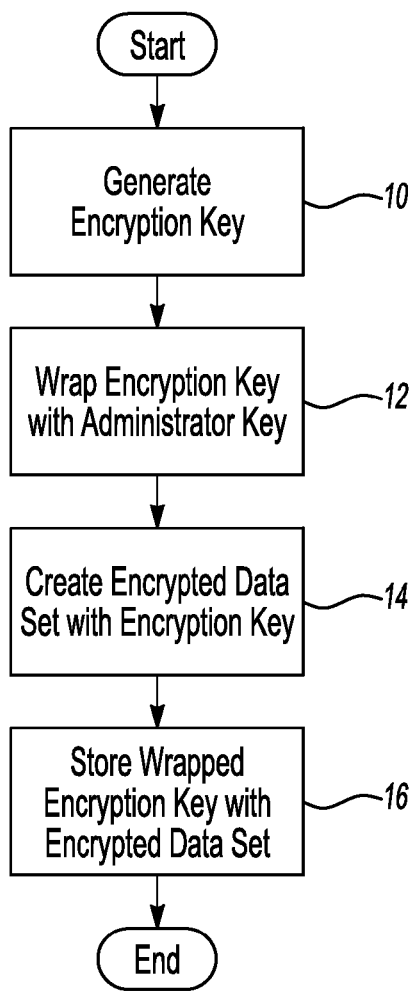
FIGS. 1-3 are flow charts depicting strategies for manipulating data of a copy-on-write file system according to certain embodiments of the invention.

ZFS is a file system designed by Sun Microsystems for the Solaris Operating System. The features of ZFS include support for high storage capacity, integration of the concepts of file system and volume management, snapshots and copy-on-write ("COW") clones, on-line integrity checking and repair, and RAID-Z. ZFS is implemented as open-source software, licensed under the Common Development and Distribution License (CDDL).

Unlike traditional file systems, which may reside on single devices and thus require a volume manager to use more than one device, ZFS file systems are built on top of virtual storage pools referred to as zpools. A zpool is constructed of virtual devices (vdevs), which are themselves constructed of block devices: files, hard drive partitions or entire drives, with the last being the recommended usage.

Block devices within a vdev may be configured in different ways, depending on needs and space available: non-redundantly (similar to RAID 0), as a mirror (RAID 1) of two or more devices, as a RAID-Z group of three or more devices, or as a RAID-Z2 group of four or more devices. The storage capacity of all vdevs is available to all of the file system instances in the zpool.

A quota may be set to limit the amount of space a file system instance can occupy and a reservation can be set to guarantee that space will be available to a file system instance.

ZFS is a 128-bit file system. The limitations of ZFS are designed to be so large that they may not be encountered in practice for some time. For example, some theoretical limits in ZFS are listed in Table 1.

TABLE 1

| Number of snapshots of any file system | $2^{64}$ |
|---|---|
| Number of entries in any individual directory | $2^{48}$ |
| Maximum size of a file system | 16 EiB |
| Maximum size of a single file | 16 EiB |
| Maximum size of any attribute | 16 EiB |
| Maximum size of any zpool | $2^{56}$ ZiB |
| Number of attributes of a file | $2^{56}$ |
| Number of files in a directory | $2^{56}$ |
| Number of devices in any zpool | $2^{64}$ |
| Number of zpools in a system | $2^{64}$ |
| Number of file systems in a zpool | $2^{64}$ |

ZFS uses a COW transactional object model. All block pointers within the file system contain a 256-bit checksum of the target block which is verified when the block is read. Blocks containing active data are not overwritten in place. Instead, a new block is allocated, modified data is written to it and then any metadata blocks referencing it are similarly read, reallocated and written. To reduce the overhead of this process, multiple updates are grouped into transaction groups. An intent log is used when synchronous write semantics are required.

If ZFS writes new data, the blocks containing the old data may be retained, allowing a snapshot version of the file system to be maintained. ZFS snapshots are created quickly, since all the data composing the snapshot is already stored. They are also space efficient, since any unchanged data is shared among the file system and its snapshots.

Writeable snapshots ("clones") may also be created, resulting in two independent file systems that share a set of blocks. As changes are made to any of the clone file systems, new data blocks are created to reflect those changes. Any unchanged blocks continue to be shared, no matter how many clones exist.

ZFS employs dynamic striping across all devices to maximize throughput. As additional devices are added to the zpool, the stripe width automatically expands to include them. Thus, all disks in a pool are used which balances the write load across them.

ZFS uses variable-sized blocks of up to 128 kilobytes. Currently available code allows an administrator to tune the maximum block size used as certain workloads do not perform well with large blocks.

If data compression is enabled, variable block sizes are used. If a block can be compressed to fit into a smaller block size, the smaller size is used on the disk to use less storage and improve IO throughput (though at the cost of increased CPU use for the compression and decompression operations).

In ZFS, file system manipulation within a storage pool may be easier than volume manipulation within a traditional file system. For example, the time and effort required to create or resize a ZFS file system is closer to that of making a new directory than it is to volume manipulation in some other systems.

Pools and their associated ZFS file systems may be moved between different platform architectures, including systems implementing different byte orders. The ZFS block pointer format stores file system metadata in an endian-adaptive way. Individual metadata blocks are written with the native byte order of the system writing the block. When reading, if the stored endianness does not match the endianness of the system, the metadata is byte-swapped in memory. This does not affect the stored data itself. As is usual in POSIX systems, files appear to applications as simple arrays of bytes, so applications creating and reading data remain responsible for doing so in a way independent of the underlying system's endianness.

Secure deletion of data by encrypting the data and destroying the key is a known best practice and is recommended and authorized by the National Institute of Standards and Technology. In a pooled storage system, such as ZFS, it may be desirable to securely delete only sets of data rather than all of the data on a disk, whether physical or virtual. Achieving secure data deletion in pooled storage systems, however, may be difficult for several reasons: drives may contain information that is no longer online because of drive unavailability; scrubbing data off drives may be time consuming and may require destruction of all of the data on the drive or intimate knowledge of the implementation of the file system to delete only fragments of it; freed space may also need to be scrubbed; and, original data that has been re-mapped by the drive may be overwritten by subsequent write operations.

In certain embodiments, encryption support may be added to copy-on-write file systems, such as the ZFS storage system, thus allowing the encryption algorithm suite and key to be specified on a per dataset basis. In these embodiments, the data encryption keys managed by an administrator or end user are not used directly but instead used as wrapping keys. The wrapping key may be used to protect the encryption keys for many different datasets.

Secure deletion of a dataset may be achieved in a pooled storage system with encryption, such as that implemented for ZFS, by performing a normal dataset "destroy." As apparent to those of ordinary skill, this operation does not overwrite any data on disk but rather moves the blocks to a free list. The "destroy" operation may then be followed by a change of the wrapping key that was in use for that data set.

Referring now to FIG. 1, an encryption key is generated as indicated at 10. For example, using a system random number generator or dedicated hardware key generation system, an encryption key of suitable length is created. Some ZFS implementations may support Advanced Encryption Standard (AES) keys with lengths of 128 bit and 256 bit, but may be extended for other algorithms and key lengths.

As indicated at 12, the encryption key is wrapped with an administrator's key. For example, the encryption key may be wrapped by encrypting it with another key using AES in CCM mode. This may provide both confidentiality and a cryptographic strength integrity check that this is the correct key.

As indicated at 14, an encrypted data set is created with the encryption key. For example, a set of blocks from a storage pool may be used to create a new data set. File system data and metadata, such as filenames, timestamps, permissions, etc., may be encrypted using the encryption key before being written to disk. All future blocks allocated for this data set are encrypted with the encryption key. In this embodiment, the encryption key value (or the reference to) is assumed to be available. In other embodiments, the wrapped encryption key must first be unwrapped before encrypting the data set. In still other embodiments, the encrypted data set may be created before the encryption key is wrapped. Other configurations are also possible.

As indicated at 16, the wrapped encryption key is stored with the encrypted data set. For example, an unencrypted property area of the data set may be used to store the wrapped encryption key. In certain ZFS implementations, this may be stored alongside properties for compression, checksum, network sharing, etc.

Figure 2:
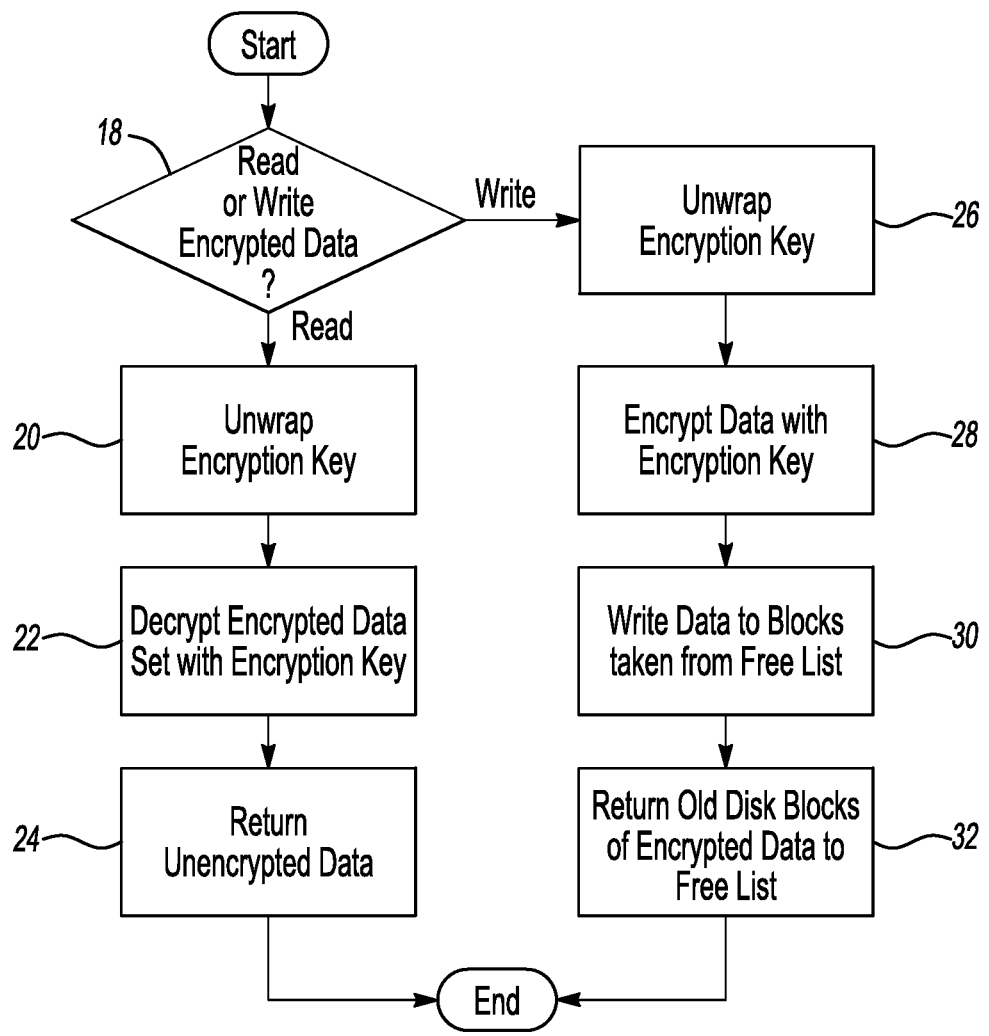

Referring now to FIG. 2, it is determined whether a read or write operation is to be performed on the encrypted data discussed with reference to FIG. 1 as indicated at 18 based on, for example, input from a user.

If a read is to be performed, the encryption key is unwrapped, e.g., unencrypted, as indicated at 20. As indicated at 22, the encrypted data set is decrypted with the encryption key. As indicated at 24, the unencrypted data is returned, for example, to the user.

If a write is to be performed, the encryption key is unwrapped as indicated at 26. As indicated at 28, data to be written is encrypted with the encryption key. As indicated at 30, the encrypted data is written to data blocks taken, for example, from a free list. As indicated at 32, old disk blocks of encrypted data are returned to the free list.

Figure 3:
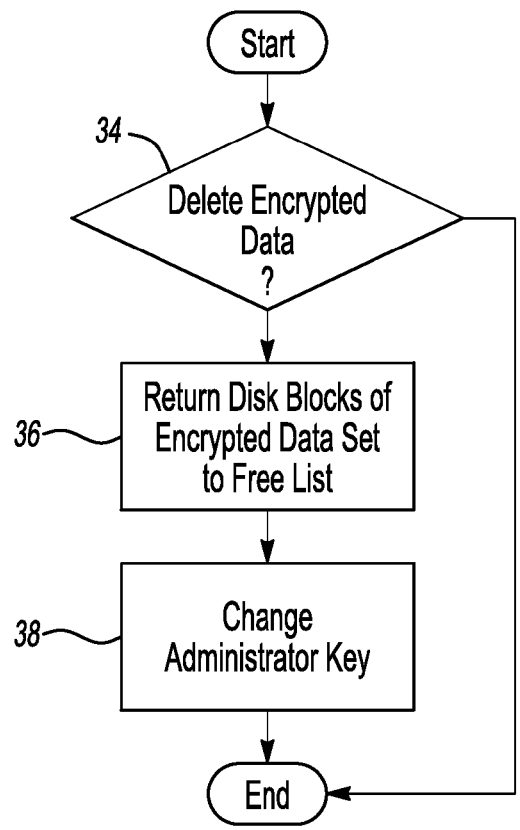

Referring now to FIG. 3, it is determined whether to delete the encrypted data set as indicated at 34 based on, for example, input, such as a delete command, from the user.

If yes, disk blocks defining the encrypted data set are returned to the free list as indicated at 36. For example, blocks allocated from the COW storage pool for the encrypted data set to be deleted may be returned to the free list. The data set may then be removed from the list of active/known data sets.

As indicated at 38, the administrator's key is altered to make information in the encrypted data set inaccessible. For example, a key change operation on the administrator's key may be performed. This may involve decrypting encryption keys for all currently active data sets (the data set "deleted" at 36, however, is not included) and wrapping all the encryption keys associated with currently active data sets with a different and/or altered administrator's key. This ensures that the encryption keys associated with those data sets that have been "deleted" can no longer be unwrapped (decrypted) using the new administrator's key.

While certain embodiments have been explained with reference to ZFS, as will be apparent to those of ordinary skill, other pooled and/or copy-on-write implementations are also possible. Furthermore, while embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method for making information in a data set of a copy-on-write file system inaccessible, the method comprising:
generating, by a computer, a first key for encrypting a data set of a copy-on-write file system;
wrapping the first key with a second key;
creating an encrypted data set with the first key;
storing the wrapped first key with the encrypted data set in any available free blocks of the copy-on-write file system, wherein the free blocks are new blocks allocated;
receiving a command to delete the encrypted data set; and
without overwriting in place blocks allocated to the second key, using the copy-on-write file system to alter or change the second key to make information in the encrypted data set of the copy-on-write file system inaccessible.

2. The method of claim 1 further comprising deleting the encrypted data set.

3. The method of claim 1 further comprising returning disk blocks defining the encrypted data set to a free list.

4. The method of claim 1 wherein the first key is generated randomly.

5. The method of claim 1 further comprising unwrapping the first key.

6. The method of claim 5 further comprising decrypting the encrypted data set using the first key.

7. The method of claim 5 further comprising altering the decrypted data set.

8. The method of claim 7 further comprising encrypting the altered data set using the first key.

9. A system for making information in a data set of a copy-on-write file system inaccessible, the system comprising:
a computing device having at least one processor configured to
generate a first key for encrypting a data set of a copy-on-write file system,
create an encrypted data set with the first key,
encrypt the first key with a second key,
store the encrypted first key with the encrypted data set in any available free blocks of the copy-on-write file system, wherein the free blocks are new blocks allocated,
receive a command to delete the encrypted data set, and
without overwriting in place blocks allocated to the second key, use the copy-on-write file system to alter or change the second key to make information in the encrypted data set inaccessible.

10. The system of claim 9 wherein the first key is generated randomly.

11. The system of claim 9 wherein the at least one processor is further configured to decrypt the first key with the second key.

12. The system of claim 11 wherein the at least one processor is further configured to decrypt the encrypted data set with the first key.

13. The system of claim 11 wherein the at least one processor is further configured to alter the decrypted data set.

14. The system of claim 13 wherein the at least one processor is further configured to encrypt the altered data set with the first key.

15. The system of claim 9 wherein the at least one processor is further configured to return disk blocks defining the encrypted data set to a free list.

16. The system of claim 15 wherein the at least one processor is further configured to remove the encrypted data set from a list of active or known data sets.

\* \* \* \* \*